United States Patent Office 3,778,489
Patented Dec. 11, 1973

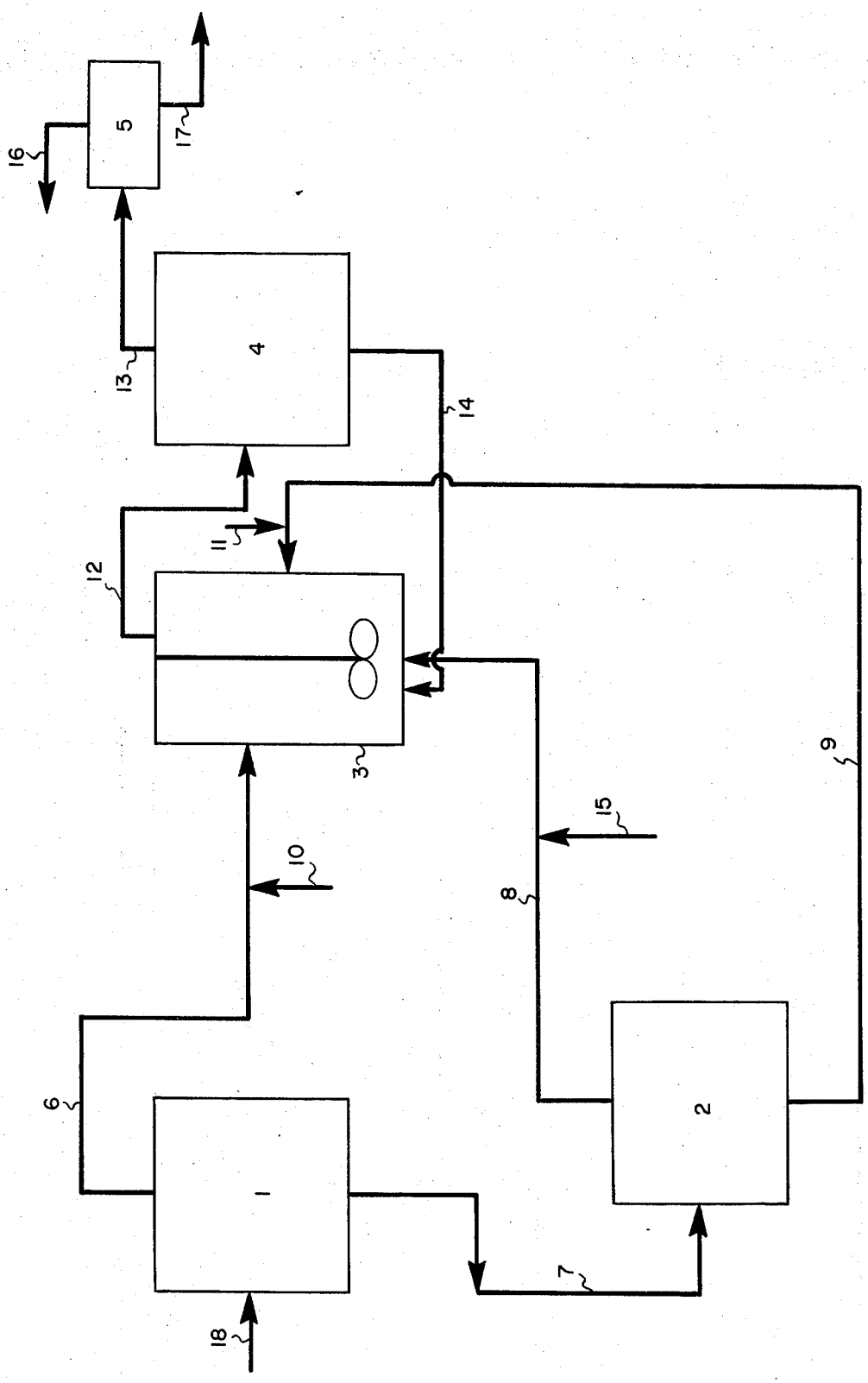

3,778,489
ALKYLATION WITH SEPARATE OLEFIN
STREAMS INCLUDING ISOBUTYLENE
Paul T. Parker, Baton Rouge, La., and Ivan Mayer, Summit, N.J., assignors to Esso Research and Engineering Company
Continuation-in-part of abandoned application Ser. No. 99,707, Dec. 18, 1970. This application Dec. 16, 1971, Ser. No. 208,873
Int. Cl. C07c *3/52, 3/54*
U.S. Cl. 260—683.43                 27 Claims

ABSTRACT OF THE DISCLOSURE

An alkylation process comprising contacting a paraffin, preferably a $C_4$-$C_6$ isoparaffin, and a strong alkylation catalyst in an alkylation zone with a first olefin-containing stream substantially free of isobutylene and 2-methyl-butene-1 and a second olefin-containing stream comprising isobutylene or 2-methyl-butene-1, where the first and second olefin-containing streams are introduced into the alkylation zone at separate points along the zone, the points situated so as to prevent any appreciable mixing of the first and second olefin-containing streams with each other prior to contacting the catalyst and recovering alkylate product of high octane number.

CROSS-REFERENCE TO RELATED APPLICATIONS

This is a continuation-in-part of copending application Ser. No. 99,707, filed Dec. 18, 1970, now abandoned.

BACKGROUND OF THE INVENTION

Field of the invention

The present invention relates to an improved alkylation process. More particularly, the invention concerns the preparation of branched chain hydrocarbons by reaction of paraffinic hydrocarbons and olefins in the presence of a strong acid catalyst.

Description of the prior art

Acid catalyzed hydrocarbon conversion processes comprising contacting an alkane with an alkene are well known. The reactants are generally contacted in the liquid phase and within a broad temperature range of about —100° to 100° F. with a strong acid catalyst such as, for example, sulfuric acid, halosulfuric acids, such as fluorosulfuric acid, or halogen acids such as hydrofluoric acid. Alkylation processes employing fluorosulfuric acid as a catalyst are described in U.S. Pat. 2,313,103, U.S. Pat. 2,344,469 and U.K. Pat. 537,589. The use of other acids such as trihalomethanesulfonic acid, e.g. trifluoromethanesulfonic acid, has also been described (T. Gramstad and R. N. Haszeldine, J. Chem. Soc., 1957, 4069–79).

Alkylation reactions of the above-mentioned type have encountered difficulties directly resulting from the high activity of the strong acid catalyst used in the reactions. These difficulties have been overcome by the use of catalyst promoters in conjunction with the strong acids. Thus, for example, catalyst promoters such as water, alcohols, thiols, ethers, thioethers, sulfonic and carboxylic acids and their derivatives have been employed. Additionally, materials such as boron trifluoride, methyl isobutyl oxonium chloride, dimethyl isopropyl sulfonium chloride and the like have been used in the past.

Alkylation reactions in the presence of strong acid catalysts have been plagued with several other difficulties. Specifically, when mixed $C_2$, $C_3$, $C_4$ and/or $C_5$ refinery olefin streams are employed in the alkylation process, it has been found that there is an unfavorable interaction between certain olefins present in the olefin streams, such as isobutylene or 2-methyl-butene-1 and butene-1 or propylene, thereby producing poor quality alkylate product. This is due in part to the formation of undesirable materials such as dimethylhexanes and methyl heptanes at the expense of the preferred trimethylpentanes. It has been suggested that olefins capable of forming tertiary carbonium ions under acidic conditions react in this manner with terminal olefins unable to form such carbonium ions under the acidic conditions, thereby yielding the undesired products. Although the exact reaction mechanism is not known, a mechanism consistent with the above reasoning has been previously proposed and is shown below for the reaction of isobutylene and butene-1:

(1) $(CH_3)_2C=CH_2 + H^+ \longrightarrow (CH_3)_3C^+$ (2) $(CH_3)_3C^+ + H_2C=CHCH_2CH_3 \longrightarrow (CH_3)_3C-CH_2\overset{+}{C}HCH_2CH_3$ (3) $(CH_3)_3C-CH_2\overset{+}{C}HCH_2CH_3 \longrightarrow (CH_3)_3C-\overset{+}{C}HCH_2CH_2CH_3$ (4) $(CH_3)_3C-\overset{+}{C}HCH_2CH_2CH_3 \longrightarrow (CH_3)_2\overset{+}{C}-\underset{\underset{CH_3}{|}}{C}HCH_2CH_2CH_3$ (5)

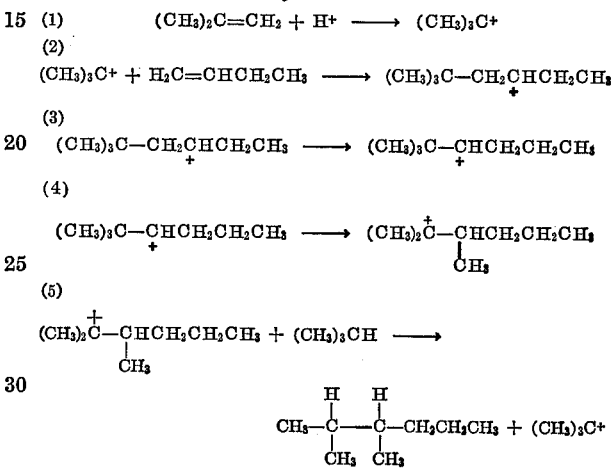

The inferior quality of the alkylate can be rationalized by (1) a rapid protonation of isobutylene to form a tertiary carbonium ion followed by (2) reaction with the terminal carbon of butene-1. Similar equations can be written for the cases of propylene and 2-methyl-butene-1. Thus, in the case of $C_2$-$C_5$ olefin-containing streams, propylene, butene-1 or pentene-1 would be expected to react unfavorably with isobutylene or 2-methyl-butene-1. To avoid these difficulties it has been found in the past that removal of the isobutylene and/or 2-methyl-butene-1 from the $C_3$, $C_4$ and/or $C_5$ olefin-containing streams results in the elimination of the deleterious reactions hereinabove described.

Formerly, isobutylene and/or 2-methyl-butene-1 could only be alkylated in reaction zones separate from those wherein olefin streams containing butene-1 type olefins were alkylated, due to the unfavorable interactions already noted. This has proven costly in terms of redundancy of alkylation equipment and loss of process efficiency.

SUMMARY OF THE INVENTION

In accordance with the present invention, high octane alkylate is prepared by contacting a paraffin and a strong alkylation catalyst, in an alkylation zone, with a first olefin-containing stream substantially free of isobutylene and 2-methyl-butene-1 and a second olefin-containing stream comprising isobutylene, 2-methyl-butene-1 or mixtures thereof. The first and second olefin-containing streams are introduced into the alkylation zone at separate points therein, the points situated so as to prevent any appreciable mixing of the first and second olefin-containing streams with each other prior to their contacting the catalyst.

Preferably, there will be less than about 10 wt. percent, most preferably less than about 5 wt. percent (based on total olefin) of isobutylene and 2-methyl-butene-1 present in the first olefin-containing stream. In general it is preferable that less than about 15 volume percent, most preferably less than about 5 volume percent (based on total olefin in the individual streams) of the olefin-containing streams mix with each other prior to contacting the catalyst.

It is noted, however, that more than about 15 volume percent mixing of the olefin streams can be tolerated once the olefin feed streams have substantially contacted the catalyst, i.e. at least about 20 volumes of catalyst per volume of olefin in the individual olefin streams, preferably about 100 volumes or more of catalyst per volume of olefin. This is due to the fact that at this point substantial conversion of the reactants to alkylate product has occurred, and, therefore, the detrimental effects of premixing are eliminated.

The catalyst compositions which can be employed in the process of the present invention include the strong acids such as sulfuric acid, hydrogen fluoride, halosulfuric acid, such as fluorosulfuric acid, trihalomethanesulfonic acid, such as trifluoromethanesulfonic acid and the like. In addition, strong acids in combination with catalyst promoters may also be employed. Thus, for example, halosulfuric acids, trihalomethanesulfonic acids or mixtures thereof may be used in conjunction with varying quantities of water, aliphatic and cycloaliphatic alcohols, thiols, ethers and thioethers, aliphatic, cycloaliphatic or aromatic sulfonic and carboxylic acids and their derivatives or inorganic acids.

The alcohols and thiols preferably contain 1 to 10 carbon atoms and 1 to 10 hydroxyl or mercapto groups per molecule. The lower molecular weight saturated alcohols and thiols are most preferred and contain desirably 1 to 7 carbon atoms and 1 to 4 hydroxyl or mercapto groups per molecule. The ethers and thioethers are preferably saturated and contain 2 to 10, preferably 2 to 5 carbon atoms per molecule. In the latter instance while monoether and monothioether compounds are preferred promoters, compounds containing up to 3 or more alkoxy or thioalkoxy groups are also contemplated. The sulfonic and carboxylic acids preferably contain 1 to 10, most preferably 1 to 7 carbon atoms per molecule. In addition, the acids can be substituted with one or more carboxy or sulfo groups. The acid derivatives include the esters and anhydrides and preferably contain 2 to 20 carbon atoms, most preferably 2 to 10 carbon atoms per molecule.

The aliphatic, cycloaliphatic and aromatic portions of the aforementioned promoters can be optionally substituted with a variety of substituents such as halogen atoms, and such groups as hydroxy, mercapto, $C_1$–$C_5$ alkoxy, $C_1$–$C_5$ alkylthio, $C_1$–$C_5$ perhaloalkyl, $C_2$–$C_6$ carboalkoxy, carboxy, $C_1$–$C_{10}$ hydrocarbyl, preferably $C_1$–$C_5$ alkyl or $C_3$–$C_{10}$ cycloalkyl or combinations thereof.

The inorganic acids will in general be less acidic than the strong acid components of the catalyst system and desirably will have $H_0$ values, i.e. $-\log h_0$ (Hammett acidity function), greater than about $-11$ (see Gould, E., Mechanism and Structure in Organic Chemistry, New York, Holt, Rinehard & Winston, Inc., 1959, 106). Preferred inorganic acids contain 1 to 4 hydroxyl groups per molecule.

Preferred catalyst promoters contain either a hydroxy group, such as alcohols or a hydroxy group precursor, such as ethers which cleave to form alcohols under the acidic conditions of the subject invention. Of these, the most preferred compounds are the lower molecular weight alcohols such as ethyl alcohol, the lower molecular weight ethers such as diethyl ether and water. It is noted that while the catalyst promoter and strong acid are desirably premixed prior to introduction into the alkylation zone, the process also contemplates the in situe formation of the catalyst system. Thus, for example, $HSO_3F$, $SO_3$, HF and a promoter can be fed to the alkylation zone in the case of the $HSO_3F$/promoter catalyst system. It has been found that the concentration of the promoter in the catalyst system is important to the production of high-quality alkylate. The promoter is admixed with the strong acid catalyst component in amounts ranging from about 5 to about 45 mole percent based on total acid in the catalyst, preferably about 10 to about 30 mole percent, and still more preferably about 15 to about 25 mole percent, e.g. 20 mole percent. In some instances, however, it may be desirable to use somewhat lower or higher amounts of promoter where, for example, increased catalyst activity or selectivity is desired.

In the case of hydroxyl-containing promoters or promoters containing hydroxyl group precursors, i.e. latent hydroxyl groups, the concentration of the promoter in the total catalyst may fall below the above-specified concentration range, i.e. about 5 to about 45 mole percent based on acid. It appears that the promoting efficiency of hydroxy compounds is directly related to the overall number of hydroxyl groups or latent hydroxyl groups present per molecule. Thus, ethanol with one hydroxyl group should have promoter activities similar to 0.5 mole of ethylene glycol with two hydroxyl groups. Hence, as the number of hydroxyl groups or latent hydroxyl groups per molecule of promoter increases, the required concentration of total compound in the catalyst will decrease. It is speculated that the same relationship also holds for thiol and thioether compounds. Although the broad concentration ranges are generally independent of the type of promoter used, the preferred or optimal range will vary depending on the structure of the promoter, the reactor temperature, the concentration of olefin in the feed, the olefin space velocity, and the isoparaffin concentration in the reactor hydrocarbon.

The process of the invention also contemplates the use of strong Bronsted acids in conjunction with one or more Lewis acids of the formula $MX_n$ where M is selected from the Group IV–B, V or VI–B elements of the Periodic Table, V is a halogen atom, preferably fluorine, and $n$ varies from 3 to 6. The Periodic Table referred to is that described in "Encyclopedia of Chemistry," Reinhold Publishing Corporation, 2nd edition, 1966, 790. Suitable IV–B, V or VI–B elements include titanium, vanadium, zirconium, niobium, phosphorus, tantalum, molybdenum, chromium, tungsten, arsenic, antimony, bismuth and the like. The term "elements" as used herein refers to the metals and metalloids of the aforementioned Groups of the Periodic Table. Particularly preferred metal halides are the metal fluorides that include antimony pentafluoride, tantalum pentafluoride, niobium pentafluoride, titanium tetrafluoride, vanadium pentafluoride and the like. Particularly preferred catalyst combinations include antimony pentafluoride-fluorosulfuric acid, tantalum pentafluoride-fluorosulfuric acid, niobium pentafluoride-fluorosulfuric acid, titanium tetrafluoride-fluorosulfuric acid, antimony pentafluoride-trifluoromethanesulfonic acid, tantalum pentafluoride-trifluoromethanesulfonic acid, niobium pentafluoride-trifluoromethanesulfonic acid, titanium tetrafluoride-trifluoromethanesulfonic acid and the like. Generally the catalyst comprises about 1 to 20 moles of the Bronsted acid to 1 mole of the Lewis acid. Preferably, the molar ratio of Bronsted to Lewis acid ranges from about 5:1 to 1:1. In addition to the above-mentioned catalysts, crystalline aluminosilicate zeolites may also be used as process catalysts.

The amount of total olefin contacted with catalyst can range from about 0.05 to 1000 volumes of olefin per hour per volume of catalyst inventory in the reactor (v./v./hr.), i.e. olefin space velocity. Preferably, the olefin space velocity can range from about 0.05 to 10 v./v./hr., and still more preferably, from about 0.05 to 1 v./v./hr., e.g. 0.1 v./v./hr. The volume percent of total catalyst in the reaction mixture or emulsion in the reactor (when liquid phase operations are used), which mixture or emulsion comprises a hydrocarbon phase and a catalyst phase, is maintained at high levels, i.e. from about 40 to 90 volume percent based on total reaction mixture and preferably from about 50 to 80 volume percent in order to assure substantial contact of the olefin streams with the catalyst prior to contact with each other. The isoparaffin concentration, including alkylate, in the hydrocarbon phase (in a liquid phase process) of the reaction mixture can range from about 45 to 95 volume percent based on the total volume of the hydrocarbon phase and preferably from about 50 to 90 volume percent. Such isoparaffin concentrations can be maintained by recycling unreacted isoparaffin to the reactor.

The catalysts may be used undiluted or, alternatively, diluted in solvents inert under the reaction conditions or incorporated with a suitable solid carrier or support. Typical diluents include sulfuryl chloride fluoride, sulfuryl chloride, fluorinated hydrocarbons, mixtures thereof and the like. The diluent:catalyst volume ratio can range from about 20:1 to 1:1. Higher dilutions may be desirable, for instance, in those reactions that proceed with high exothermicity. Suitable solid carriers that can be used should be substantially inert to the catalyst under the reaction conditions. Therefore, active supports may be rendered inert by coating them with an inert material such as antimony trifluoride or aluminum trifluoride. Examples of such carriers include silica gel, anhydrous $AlF_3$, aluminum phosphate, carbon, coke, firebrick, and the like.

Suitable olefinic reactants include $C_2$–$C_{12}$ terminal and internal mono-olefins such as ethylene, propylene, isobutylene, butene-1, butene-2, trimethylethylene, the isomeric pentenes and similar higher mono-olefinic hydrocarbons of either straight chain or branched chain structure. Preferably, the $C_2$–$C_5$ mono-olefins are used, although the highly branched $C_7$–$C_{12}$ mono-olefins may also be used. The reaction mixtures can also contain some small amounts of diolefins.

Although it is desirable from an economic standpoint to use the normally gaseous olefins as reactants, normally liquid olefins may be used. Thus the invention contemplates the use of reactable polymers, copolymers, interpolymers, cross-polymers and the like of the above-mentioned olefins, such as for example, the diisobutylene and triisobutylene polymers, the codimer of normal butylene and isobutylene, of butadiene and isobutylene, and the like. Mixtures of two or more of the olefins above described can also be used as the process feed-stock.

The instant catalyst systems are particularly suited for use in refinery alkylation processes. Thus, the process of the invention contemplates the use of various refinery cuts as feedstocks. By way of example, $C_2$ $C_3$, $C_4$ and/or $C_5$ olefin cuts from thermal and/or catalytic cracking units; field butanes which have been subjected to prior isomerization and partial dehydrogenation treatment; refinery stabilizer bottoms; spent gases; normally liquid products from sulfuric acid or phosphoric acid catalyzed polymerization and copolymerization processes; and products, normally liquid in character, from thermal and/or catalytic cracking units, are all excellent feedstocks for the present process. Such feeds are preferably dried to control excess water build-up, i.e. to about 5 to 15 p.p.m. (weight) of water in the feed before entering the reactor. Preferred olefin streams include, for example, the $C_2$–$C_4$, $C_3$–$C_4$ and $C_2$–$C_5$ olefin streams.

The hydrocarbon feedstocks that are reacted with the olefins desirably comprise straight and/or branched chain $C_2$–$C_{10}$ paraffins such as hexane, butane and the like and preferably $C_4$–$C_6$ isoparafins such as isobutnae, isopentane, isohexane and the like. While open chain hydrocarbons are preferred, cycloparaffins may also be used.

As indicated supra, it has been determined, in the past, that certain mixtures of olefins in the olefin stream feed to the alkylation zone cause unfavorable side reactions which diminish desirable $C_8$ alkylate product formation. Specifically, it has been determined that olefins which form tertiary carbonium ions under acidic conditions react unfavorably with terminal olefins not able to form tertiary carbonium ions under acidic conditions. Thus, for example, a mixture of isobutylene and butene-1 forms large quantities of dimethylhexanes (mainly 2,3-dimethylhexane) at the expense of the desired trimethylpentanes. It is therefore apparent that in the case of $C_2$–$C_5$ olefin streams, for example, propylene, butene-1 or pentene-1 will react unfavorably with isobutylene and/or 2-methylbutene-1. In order to minimize these unfavorable reactions, removal of the above-mentioned olefins from the olefin stream must be accomplished.

While propylene, butene-1 and/or pentene-1 can be removed from the olefin stream, it is more convenient to remove the isobutylene and/or 2-methyl-butene-1 instead. Any separation technique conventional in the art may be used such as distillation. Thus, in one embodiment the isobutylene and/or 2-methyl-butene-1 are distilled or fractionally separated from the olefin stream.

Due to the high alkylation rates of the olefins in the presence of strong acid catalysts, it has been found that substantial conversion of the olefinic material to alkylate product of high octane number can be achieved with very short contact times, as low as 0.2 second. As a consequence thereof, it has been found that the separated olefins, e.g. isobutylene and/or 2-methyl-butene-1 in the case of the $C_2$–$C_5$ olefin-containing streams, can be admitted to the same alkylation zone as the main olefin stream, if separate injection points leading into the reactor are employed. The only important requirement is that the individual injection points be sufficiently spaced so as to prevent any appreciable mixing, as hereinabove described, of the various separately injected olefin streams prior to their substantially contacting the catalyst in the alkylation zone.

Conventional techniques, well known in the art, for introducing the olefin-containing streams into the reactor, may be employed. A preferred introduction means comprises a feed ring configuration as more fully described in U.S. Pat. 3,109,042. The feed ring consists of a plurality of small holes or nozzles separated by about 1 to 3 inches and having a diameter size of about 0.01 to 0.06 inch in order to allow introduction of the olefin into the reaction zone at high velocity. In this context it is noted that small diameter nozzle size and high olefin stream velocities, for example about 100 to 200 feet per second, assure thorough mixing of the individual olefin streams with catalyst prior to their mixing with each other. Two feed lines lead into the ring and are mounted on opposite sides to provide entry of the separate olefin streams into the ring system. The ring itself is partitioned roughly in half by appropriate olefin stream isolating baffles mounted within the ring to prevent mixing of the olefin streams. Other means for introducing the olefin streams into a reactor comprises a plurality of injection points located along the length of the reactor with sufficient spacial separation to prevent appreciable backmixing of the olefin streams.

Preferably, the olefin streams are first diluted with paraffin before being introduced into the reactor. The olefin concentration in the paraffin feed ranges from about 0.5 to 25 volume percent based on total feed, and preferably below about 10 volume percent. Translated into volume ratios, high volume ratios of paraffin to olefin ranging from about 10:1 to about 200:1 or higher are preferred although somewhat lower ratios may be used, e.g. 3:1. Correspondingly high volume ratios of paraffin to olefin are also desired within the reaction zone. Preferably, the paraffin/olefin volume ratio therein ranges from about 20:1 to 2000:1 or higher.

The process may be carried out either as a batch or continuous type operation although it is preferred for economic reasons to carry out the process continuously. It has been generally established that in alkylation processes, the more intimate the contact between feedstock and catalysts the better the yield of saturated product obtained. With this in mind, the present process, when operated as a batch operation, is characterized by the use of high levels of agitation, i.e. vigorous mechanical stirring or shaking of the reactants and catalyst.

In continuous operation, in one embodiment, reactants may be maintained at sufficient pressures and temperatures to keep them substantially in the liquid phase and then continuously forced through dispersion devices into the reaction zone. The dispersion devices may be jets, porous thimbles and the like. The reactants are subsequently mixed with the catalyst by conventional mixing means such as mechanical agitators and the like. After a sufficient time the product can then be continuously separated from the catalyst and withdrawn from the reaction system while the partially spent catalyst is recycled to the reactor. If desired, a portion of the catalyst can be regenerated or reactivated by any suitable tretament and return to the alkylation reactor.

As in other alkylation processes, more accurate control of the quality of the final product may be obtained if the reaction system is provided with a recycling feature wherein the partially consumed isopraffins are recovered, recycled and mixed with a fresh feed and returned to the feed dispersion device in the reactor. In general, reaction and/or recovery schemes and apparatus employed in conjunction with prior art liquid acid catalyst systems can be used with the catalyst systems of the present invention.

In carrying out alkylations using the catalyst systems of this invention, a wide temperature range may be utilized, e.g. about −80 to 150° F.; however, fairly low reaction temperatures are preferred. Therefore, temperatures ranging from about −80 to 100° F., preferably from about −60 to 100° F., most preferably from about −20 to +40° F., are usually employed. Where the reaction is carried out at temperatures above about 10° F. it is necessary that the reaction be conducted under supseratmospheric pressure, if both the reactants and catalysts are to be maintained substantially in the liquid phase (this applies only to the lower molecular weight low boiling reactants). Typically, the alkylation reaction is conducted at pressures ranging from about 1 to 20 atsmospheres.

In general, it is preferable to use pressures sufficient to maintain the reactants in the liquid phase although a vapor phase operation is also contemplated. Autorefrigerative reactors and the like may be employed to maintain liquid phase operation. Although it is preferred, as indicated previously, solvents or diluents may be employed if desired.

The aforedescribed olefins and saturated hydrocarbons are contacted with the catalyst for a time sufficient to effect the degree of alkylation desired. In general the time of contact is subject to wide variation, the length of residence time being dependent in part upon the reaction temperature, the olefin used and the catalyst concentration employed. By way of illustration, typical contact times can range from about 5 minutes to one hour or more; however, much shorter contact times, i.e. as low as 0.1 second, can also be used as indicated supra, if desired.

BRIEF DESCRIPTION OF THE DRAWING

The figure relates to a process for the alkylation of a $C_3$–$C_4$ olefin stream.

Referring to the figure in detail, a $C_3$–$C_4$ olefin stream containing propene, propane, isobutane, isobutene, butene-1, butene-2, and butane is admitted via line 18 into separator 1. In this embodiment, the separator is a fractionation column although any conventional separation technique may be used. As a result, of the fractionation a $C_3$-containing stream is taken off overhead via line 6. The remaining $C_4$ stream is removed from separator 1 via line 7 and introduced into separator 2 wherein it is split into a first stream containing isobutylene and isobutane which is removed from separator 2 via line 8 and a second stream containing butene-1, butene-2, and n-butane which is removed from separator 2 via line 9.

The $C_3$-containing stream is diluted with isobutane via line 10 prior to introduction into the reaction zone 3. The isobutylene/isobutane stream is diluted with additional isobutane via line 15 prior to introduction into reaction zone 3. Similarly, the butene-1, butene-2, n-butane stream in line 9 is diluted with isobutane via line 11 prior to introduction into zone 3. In general, the paraffin/olefin volume ratio will range between about 10:1 to 200:1 or higher in the feed line, while in the reaction zone the volume ratio will range preferably between about 20:1 to 2000:1 or higher.

As illustrated, the separate olefin-containing streams are introduced into the reactor at separate points along the reaction zone in order to prevent unfavorable mixing of the component streams prior to contacting the acid catalyst within the alkylation zone. As indicated hereinabove, other introduction means may be employed such as the previously described feed ring configuration. Preferably, less than about 5 volume percent (based on total olefin) mixing of the olefin streams should occur prior to the olefin streams contacting about 20 to about 100 or more volumes of catalyst per volume of olefin.

The reactants are agitated for a time sufficient to form the desired alkylate product which is removed via line 12 and introduced into settler 4. Recovered acid catalyst may be recycled from the settler via line 14 to reaction zone 3, or, alternatively, regenerated or reactivated prior to recycling into reaction zone 3. The alkylate product is subsequently removed from settler 4 and introduced via line 13 into separator 5 wherein unreacted isobutane is recovered via line 16 and may be recycled (recycling mode not shown) to lines 10, 11 and/or 15. Alkylate product is recovered from separator 5 via line 17 and, preferably, treated with base to neutralize any residual acid remaining in the product.

The reactor 3 is shown in this embodiment to be a single reaction zone. However, in another embodiment, the reaction zone can be segmented into a series of reaction stages separated by baffles of sufficient height to prevent mixing of the olefin streams prior to reaction with the paraffin in the presence of the alkylation catalyst. In essence then, separate reactions take place in each reaction stage of the reactor, followed by commingling of the alkylate product into one effluent stream.

DESCRIPTION OF THE PREFERRED EMBODIMENTS

The invention will be further understood by reference to the following example:

Isoparaffin-olefin alkylation reactions were performed in a continuous manner. The apparatus employed for the purposes of these studies is described below.

A cylindrically-shaped glass reactor with a volume of 300 cubic centimeters was used in the alkylation reactions. The reactor was equipped with two feed inlets positioned on opposite sides of the reactor (one inlet was situated 1 inch above the other inlet and the separation distance between the inlets was approximately 2 inches), a flat-blade mechanical stirrer to provide thorough contacting of the reactants and catalyst, a Dry-Ice cooled condenser located at each of the inlets through which condensed hydrocarbon feed comprising isoparaffin diluted with olefin was introduced, a side-arm leading to a cooled receiver wherein alkylate product was collected, and a nitrogen inlet tube through which nitrogen was introduced in order to prevent backmixing of the catalyst and incoming feeds.

The glass reactor was immersed in a cooling medium, i.e. a Dry Ice-alcohol mixture, in order to maintain the reactants and catalyst in the liquid phase. The reactor was first charged with catalyst and cooled to the desired temperature. The catalyst was then diluted with isoparaffin. The individual olefin streams, i.e. a first stream substantially free of isobutylene, and a second stream containing the isobutylene, were diluted with further amounts of isoparaffin before addition to the reactor. Alkylate product was continually withdrawn and collected in a receiver and cooled with Dry Ice-alcohol mixture. The product was separated, washed with 10% sodium hydroxide solution and then analyzed. The acid catalyst used in the runs shown below comprised a mixture of fluorosulfuric acid in 20 mole percent water based on acid. The isoparaffin used in the experiment was isobutane and the olefin feeds included isobutylene and butene-1.

Table I shows data for isobutylene and butene-1 feeds which were separately alkylated. The data is presented for comparison purposes.

In Table II two experiments were performed. The first experiment comprised introducing a mixed olefin stream of isobutylene and butene-1 diluted with isobutane at a mole ratio of isobutane to isobutylene of 100 to 1 into an alkylation zone identical to that described supra.

The second experiment comprised separately injecting the same quantities of isobutylene and butene-1 as used in the first experiment into the same alkylation zone through two inlets separated as previously described. A very significant increase in trimethylpentanes and correlating decrease in dimethylhexanes was observed by the separate injection of the two olefins into the same reaction space. In contradistinction, however, a single injection of a mixture of both olefins in the presence of isobutane led to an increased amount of dimethylhexanes with a corresponding decrease in overall alkylate quality.

What is claimed is:

1. An alkylation process comprising alkylating a paraffin in an alkylation zone by contacting said paraffin with a first olefin stream containing less than about 10 wt. percent of isobutylene and 2-methyl-butene-1 and with a second olefin stream comprising isobutylene or 2-methyl-butene-1, in the presence of an alkylation catalyst, said first and said second olefin streams being introduced into said alkylation zone at separate points therein, said points situated so as to prevent any appreciable mixing of said first and said second olefin streams with each other prior to their substantially contacting said catalyst.

2. The process of claim 1 wherein the catalyst is $H_2SO_4$, HF, $HSO_3F$ or a crystalline aluminosilicate zeolite.

3. The process of claim 1 wherein said catalyst is selected from the group consisting of fluorosulfuric acid, trifluoromethanesulfonic acid or mixtures thereof and includes a catalyst promoter.

4. The process of claim 3 wherein said catalyst promoter comprises about 5 to 45 mole percent, based on acid.

5. The process of claim 4 wherein said catalyst promoter is water, ethyl alcohol or diethyl ether.

6. The process of claim 1 wherein the catalyst comprises a mixture of fluorosulfuric acid and a Group V metal fluoride.

TABLE I

| Run number | 1 | 2 |
|---|---|---|
| Reaction conditions: | | |
| Olefin | Butene-1 | Isobutylene |
| Isoparaffin | Isobutane | Isobutane |
| Isoparaffin/olefin (volume ratio in feed to reactor) | 110.6/1 | 110.4/1 |
| Temperature, °F | 0 | 0 |
| Feed rate, v./v./hr. on catalyst (total hydrocarbon) | 14.2 | 13.7 |
| Olefin space velocity, v./v./hr. on catalyst | 0.13 | 0.12 |
| Catalyst: | | |
| Acid | $FSO_3H$ | $FSO_3H$ |
| Promoter | 20 mole percent $H_2O$ [1] | 20 mole percent $H_2O$ [1] |
| Volume catalyst, cc | 100 | 100 |
| Volume $C_5+$ alkylate yield/volume olefin [2] | 1.74 | 1.70 |
| Product distribution, wt. percent: [3] | | |
| $C_5$ | 0.55 | 1.83 |
| $C_6$-$C_7$ | 0.64 | 2.39 |
| Total $C_8$ | 98.12 | 90.66 |
| Trimethylpentanes | 93.31 | 87.97 |
| Dimethylhexanes | 4.81 | 2.69 |
| $C_9+$ | .69 | 5.12 |
| $C_6$-$C_8$ alkylate research clear octane number [2] | 100.10 | 99.90 |
| $C_6$-$C_8$ alkylate motor clear octane number [2] | 98.00 | 98.30 |
| $C_6+$ alkylate motor clear octane number [2] | 97.90 | 98.80 |

[1] Based on acid.
[2] Calculated by computer from gas phase-liquid chromatography analysis.
[3] Determined by gas phase-liquid chromatography using a 300 foot capillary column with 0.01 inch i.d. and coated with DC-550 silicon oil, in conjunction with a hydrogen flame ionization detector.

TABLE II

| Run number | 1 | 2 |
|---|---|---|
| Reaction conditions: | | |
| Olefin | Butene-1 plus isobutylene (mixed feed) [1] | Butene-1/isobutylene (separately injected) [2] |
| Isoparaffin | Isobutane | Isobutane |
| Isoparaffin/olefin (volume ratio in feed to reactor) | 108.3/1 | 108.3/1 |
| Temperature, °F | 0 | 0 |
| Feed rate, v./v./hr. on catalyst (total hydrocarbon) | 14.8 | 13.8 |
| Olefin space velocity, v./v./hr. on catalyst | 0.14 | 0.13 |
| Catalyst: | | |
| Acid | $FSO_3H$ | $FSO_3H$ |
| Promoter | 20 mole percent $H_2O$ [3] | 20 mole percent $H_2O$ [3] |
| Volume catalyst, cc | 100 | 100 |
| Volume $C_5+$ alkylate yield/volume olefin [4] | 1.70 | 1.70 |
| Product distribution, wt. percent: [5] | | |
| $C_5$ | 0.95 | 1.16 |
| $C_6$-$C_7$ | 2.12 | 1.55 |
| Total $C_8$ | 93.41 | 93.94 |
| Trimethylpentanes | 76.95 | 89.99 |
| Dimethylhexanes | 16.46 | 3.95 |
| $C_9+$ | 3.52 | 3.35 |
| $C_6$-$C_8$ alkylate research clear octane number [4] | 95.50 | 99.90 |
| $C_6$-$C_8$ alkylate motor clear octane number [4] | 94.90 | 98.10 |
| $C_6+$ alkylate motor clear octane number [4] | 94.60 | 97.70 |

[1] 1:1 mole mixture.
[2] Equal molar amounts.
[3] Based on acid.
[4] Calculated by computer from gas phase-liquid chromatography analysis.
[5] Determined by gas phase-liquid chromatography using a 300 foot capillary column with 0.01 inch i.d. and coated with DC-550 silicon oil, in conjunction with a hydrogen flame ionization detector.

11

7. The process of claim 1 wherein said paraffin is a $C_4$–$C_6$ isoparaffin.

8. The process of claim 7 wherein said isoparaffin is isobutane.

9. The process of claim 1 wherein the paraffin/olefin volume ratio within the alkylation zone ranges from about 20:1 to about 2000:1.

10. The process of claim 1 wherein the alkylation reaction is conducted at a temperature ranging from about −60° to about 100° F.

11. The process of claim 1 wherein the olefin feed streams are diluted with paraffin prior to introduction into the alkylation zone.

12. The process of claim 11 wherein the olefin concentration in the paraffin-diluted olefin feedstream is below about 10 volume percent based on the total feedstream.

13. The process of claim 12 wherein the olefin concentration in the paraffin-diluted olefin feedstream is about 0.5 to 25 volume percent based on total feed.

14. The process of claim 1 wherein less than about 15 volume percent (based on total olefin) of the first and second olefin streams mix with each other in the alkylation zone prior to their substantially contacting said catalyst.

15. The process of claim 1 wherein less than about 5 volume percent of the first and second olefin streams mix with each other prior to their contacting at least about 20 volumes of catalyst per volume of olefin.

16. The process of claim 1 wherein said first olefin stream comprises $C_2$–$C_5$ olefins.

17. A process for the alkylation of $C_2$–$C_5$ olefins, said olefins being substantially free of isobutylene, said process comprising contacting said $C_2$–$C_5$ olefins and isobutylene with an isoparaffin and a strong acid alkylation catalyst in an alkylation zone, thereby forming an alkylation reaction mixture comprising an emulsion containing hydrocarbon and catalyst, said $C_2$–$C_5$ olefins and said isobutylene, being introduced into said zone at separate points therein, said points being situated so as to prevent any appreciable mixing of said $C_2$–$C_5$ olefins and said isobutylene with each other prior to their substantially contacting said catalyst.

18. The process of claim 17 wherein the olefin space velocity ranges between about 0.05 to 1000 v./v./hr.

19. The process of claim 17 wherein the volume percent of catalyst in the reaction mixture is between about 40 to 90 volume percent based on said reaction mixture.

20. The process of claim 17 wherein the isoparaffin concentration in said reaction mixture ranges from about 45 to 95 volume percent based on total volume of hydrocarbon in said reaction mixture.

21. The process of claim 17 wherein less than about 5 volume percent of the $C_2$–$C_5$ olefins and isobutylene mix with each other prior to their substantially contacting said catalyst.

12

22. The process of claim 21 wherein less than about 5 volume percent of the $C_2$–$C_5$ olefins and isobutylene mix with each other prior to their contacting between about 20 volumes and about 100 volumes of catalyst per volume of olefin.

23. In a process for the alkylation of an isobutylene-containing olefin stream, wherein the isobutylene is substantially removed from said olefin stream prior to introducing said stream into an alkylation zone, the improvement comprising contacting said olefin stream substantially free of isobutylene and said isobutylene, with an isoparaffin and a strong acid alkylation catalyst in said alkylation zone, said olefin stream and said isobutylene being introduced into said zone at separate points therein, said points being situated so as to prevent any appreciable mixing of said olefin stream and said isobutylene with each other prior to their substantially contacting said catalyst.

24. The process of claim 23 wherein less than about 15 volume percent of the $C_2$–$C_5$ olefins and isobutylene mix with each other prior to their substantially contacting said catalyst.

25. The process of claim 23 wherein less than about 5 volume percent of the $C_2$–$C_5$ olefins and isobutylene mix with each other prior to their contacting at least about 20 volumes of catalyst per volume of olefin.

26. The process of claim 17 wherein said strong acid alkylation catalyst is selected from the group consisting of $H_2SO_4$, HF and $HSO_3F$.

27. The process of claim 23 wherein said strong acid alkylation catalyst is selected from the group consisting of $H_2SO_4$, HF and $HSO_3F$.

References Cited

UNITED STATES PATENTS

| | | | |
|---|---|---|---|
| 3,169,153 | 2/1965 | Walker et al. | 260—683.47 |
| 3,169,152 | 2/1965 | Van Pool et al. | 260—683.47 |
| 3,636,129 | 1/1972 | Parker et al. | 260—683.58 |
| 2,436,483 | 2/1948 | Newman | 260—683.49 |
| 2,313,103 | 3/1943 | Thomas | 260—683.47 |

FOREIGN PATENTS

| | | | |
|---|---|---|---|
| 537,589 | 6/1941 | Great Britain | 260—683.47 |

DELBERT E. GANTZ, Primary Examiner

G. J. CRASANAKIS, Assistant Examiner

U.S. Cl. X.R.

260—683.47, 683.48, 683.59

UNITED STATES PATENT OFFICE
CERTIFICATE OF CORRECTION

Patent No. 3,778,489  Dated December 11, 1973

Inventor(s) Paul T. Parker and Ivan Mayer

It is certified that error appears in the above-identified patent and that said Letters Patent are hereby corrected as shown below:

Table I, Run Number 2, the $C_6+$ alkylate motor clear octane number "98.80", should read --97.80--.

Signed and sealed this 16th day of July 1974.

(SEAL)
Attest:

McCOY M. GIBSON, JR.  C. MARSHALL DANN
Attesting Officer  Commissioner of Patents